Dec. 8, 1931.  R. C. CROSLEN  1,835,379

VALVE OR COCK FOR HIGH PRESSURES

Filed Oct. 4, 1929

Inventor
Roy C. Croslen
By Lyon & Lyon
Attorneys

Patented Dec. 8, 1931

1,835,379

UNITED STATES PATENT OFFICE

ROY C. CROSLEN, OF WHITTIER, CALIFORNIA, ASSIGNOR OF ONE-HALF TO CLARENCE J. PERKINS, OF LOS ANGELES, CALIFORNIA

VALVE OR COCK FOR HIGH PRESSURES

Application filed October 4, 1929. Serial No. 397,247.

This invention relates to a high-pressure valve, or cock, such as is employed in pipe connections or service lines where the valve is subjected to a very high pressure and likely to leak on account of the pressure. It is customary to employ valves in the form of plug cocks for this purpose, the plug being tapered and received in a tapered bore. In practice, however, if the plug is held sufficiently tight in the tapered bore to enable it to be leak tight, it can only be turned with great difficulty. The general object of this invention is to overcome this difficulty and to provide a valve or cock of this type having simple means which will enable it to be readily rotated when desired between its open and closed positions and vice versa, but which is so constructed as to enable the plug to be very firmly seated in the tapered bore when the valve is in its closed position, thereby insuring that the valve will be tight and will not leak, even when subjected to very high pressure.

In its preferred embodiment, the invention includes a lever connected with the plug of the valve which, in a certain position, is capable of cooperating with the valve to pull the plug tight in the tapered bore, but in another position will free the plug so that it can be readily rotated.

One of the objects of the invention is to provide a construction of this character which will operate in such a way that the plug will not become very loose, but will be normally tight in the tapered bore, even when the lever is in a position to permit free rotation of the plug.

Further objects of the invention will appear hereinafter.

The invention consists in the novel parts and combinations of parts to be described hereinafter, all of which contribute to produce an efficient valve or cock for high pressures.

A preferred embodiment of the invention is described in the following specification, while the broad scope of the invention is pointed out in the appended claims.

Figure 1:
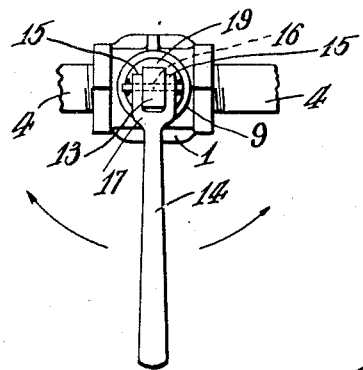
Figure 1 is a plan of a valve, or cock, embodying my invention and showing a short portion of pipe in which the valve is connected. This view is upon a reduced scale.

In practicing the invention I construct the body of the valve or cock with a tapered bore, which receive a rotatable plug. In one position of rotation of this plug its port will pass liquid or fluid through the valve. In the other position the port of the plug is disposed transversely to the pipe-line and will stop flow through the valve. I provide a handle or lever preferably connected with the small end of the plug giving considerable leverage for rotating the plug.

This handle, or lever, is mounted so that it has relative movement in another plane, and I utilize this relative movement to enable the handle or lever to be used as a lever to tighten the plug in the tapered bore in the closed position. In addition to this, I provide the valve with simple means for holding the plug normally tight when the lever is in a position to release the plug and permit its free rotation.

In order to accomplish this, the valve body 1 may be of any suitable construction, having a tapered bore 2 to receive a tapered plug 3. The ends of the valve may be threaded to receive the threaded ends of pipe connections 4, although this is unimportant and in large-sized valves, flanges may be provided for connecting to pipe flanges.

The taper on this plug should not be too sharp and is preferably about two inches to the foot. This will prevent the plug from ever becoming jammed in the tapered bore. The valve is preferably used with the small end of the plug upwardly, the plug being inserted into the valve body from the lower side and held seated by a follower cap 5 that is screwed onto the under side of the valve and which carries a small coil spring 6 that holds the plug normally tight in the tapered bore. This cap 5 preferably seats upon a soft washer or gasket 7 to insure tightness of the valve at this point.

Figure 3:
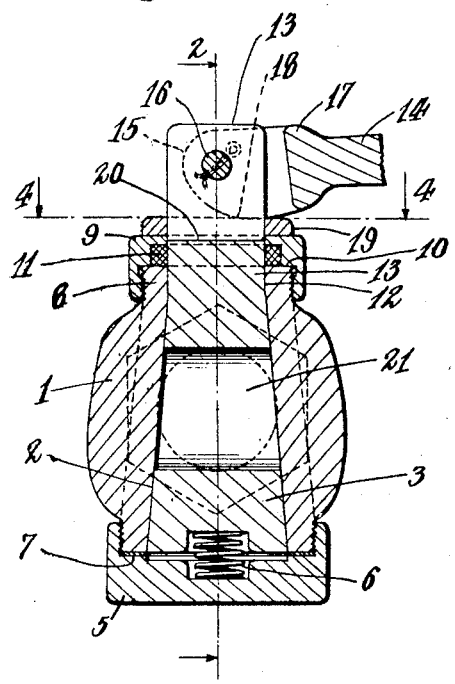
Figure 3 is a cross-section taken about on the line 3—3 of Figure 2.
Figure 4:
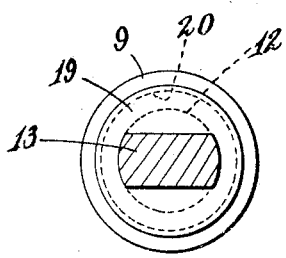
Figure 4 is a cross-section taken on the line 4—4 of Figure 3.

The upper side of the valve body is formed with a threaded neck 8 to receive a threaded packing collar 9 which screws onto the thread, said packing collar being provided with an annular shoulder 10 to seat upon the upper face of the neck. This collar 9 is counterbored on its under side to form an annular packing chamber receiving packing 11 of any suitable material. At this point the valve has a straight bore 12, which receives a cylindrical neck 13 at the upper end of the plug. This neck extends up beyond the packing 8 to enable the valve to be packed, but beyond this point the upper end of the plug is cut away on both sides to form a centrally disposed tang 13. To this tang I attach an operating lever, or handle, 14, which is preferably bifurcated at its inner end so as to form two forks 15, which straddle the tang 13 and which are pivotally attached to the tang by a pin 16. The bifurcated head 17 of the lever is formed with cam means in the form of two cam edges 18 at the lower edges of the forks, as illustrated in Figure 3. In order to give sufficient bearing area for these cam edges 18, I provide a washer 19 (see Figure 4), which drops down over the tang and seats upon the upper face of the collar 9.

In constructing the plug, care should be taken to permit some clearance at the shoulder 20 on each side of the tang. That is to say, there should be some clearance here so that the shoulder 20 is slightly depressed below the upper face of the collar 9. This will insure that the cam action of the lever can always pull the plug 3 up tight in the tapered bore. With this construction it will be evident (referring to Fig. 3), that if the outer end of the handle or lever 14 is pressed downwardly, the action of the cams 18 will give a very high leverage for pulling the plug tight. In fact, with a small valve it is not necessary to press down on the lever as the weight of the lever will be sufficient to hold the plug very tight in its closed position.

Figure 2:
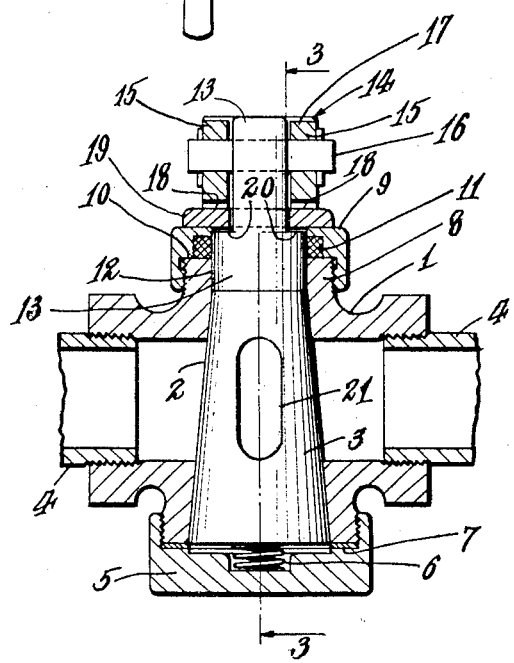
Figure 2 is a vertical section through the valve taken about on the line 2—2 of Figure 3 and showing a short portion of the connected pipe also in section. This view shows the valve in its tightly closed position and corresponds with the showing in Figure 1.

When it is desired to open the valve, it is merely necessary to raise the lever slightly by rotating it on the axis of the pin 16 and then rotate the lever in a substantially horizontal plane to rotate the valve plug 3. In Figure 2 the valve is illustrated in its closed position with the port 21 of the plug extending transversely to the axis of the pipe line.

When the valve is in its open position, as there is only slight pressure on the valve, the lever 14 need not be utilized to hold the plug tight, and hence, if desired, when the valve is open, the lever can be thrown over on the axis of the pin 16 to an opposite position from that illustrated in Figure 3.

At this time the spring 6 will operate to hold the plug 3 up in the tapered bore, and will also keep the plug normally tight while it is being rotated by the lever 14 between its open and closed positions, or vice versa.

It is understood that the embodiment of the invention described herein is only one of the many embodiments this invention may take, and I do not wish to be limited in the practice of the invention, nor in the claims, to the particular embodiment set forth.

What I claim is:

1. In a valve or cock, the combination of a body having a tapered bore, a plug rotatably mounted in the tapered bore and having a port therethrough for passing liquid through the body, a lever movably attached to the small end of the plug for rotating the plug on its axis, and said lever being mounted to swing in the plane of the axis of the plug, and having means cooperating with the body to force the plug tight in the tapered bore when the plug is in position to close the opening through the body.

2. In a valve or cock, the combination of a body having a tapered bore, a plug rotatably mounted in the tapered bore and having a port therethrough for passing liquid through the body, said plug having an extension adjacent its smaller end projecting beyond the body, a lever attached to said extension for rotating the plug in the body and having means cooperating with the body to pull the plug tight in the said tapered bore when the plug is in position to close the opening through the body.

3. In a valve or cock, the combination of a body having a tapered bore, a plug rotatably mounted in the tapered bore and having a port therethrough for passing liquid through the body, said plug having an extension adjacent its smaller end projecting beyond the body, a handle pivotally attached to said extension to swing in the plane of the axis of the plug and capable of rotating in a plane at right angles to the axis of the plug to rotate the plug in the body, said handle having means for exerting pressure against the body near the tapered end of the plug to pull the plug tight in the tapered bore when the plug is in position to close the opening through the body.

4. In a valve or cock, the combination of a body having a tapered bore, a plug rotatably mounted in the tapered bore and having a port therethrough for passing liquid through the body, said plug having an extension adjacent its smaller end projecting beyond the body, a handle pivotally attached to said extension to swing in the plane of the axis of the plug and capable of swinging in a plane at right angles to the axis of the plug to rotate the plug in the body, said handle having a head with cam-means thereon, a cap located between the cam-means and the body for receiving pressure from the cam-means and cooperating with the lever to force the plug tight in the said tapered bore when the plug is in position to close the opening through the body.

5. In a valve or cock, the combination of a body having a tapered bore, a plug rotatably mounted in the tapered bore and having a port therethrough for passing liquid through the body, said plug having an extension adjacent its smaller end projecting beyond the body, a lever pivotally attached to said extension for rotating the plug in the body, a spring with means for carrying the same, for holding the plug normally tight in the tapered bore, said lever having a head with cam-means, and said valve having means cooperating with the cam-means to enable the lever to force the plug abnormally tight in the tapered bore when the plug is in position to close the opening through the body.

Signed at Whittier, California, this 27th day of September 1929.

ROY C. CROSLEN.